P. M. KLING.
SPRING WHEEL.
APPLICATION FILED AUG. 15, 1906.
954,522.
Patented Apr. 12, 1910.
2 SHEETS—SHEET 1.
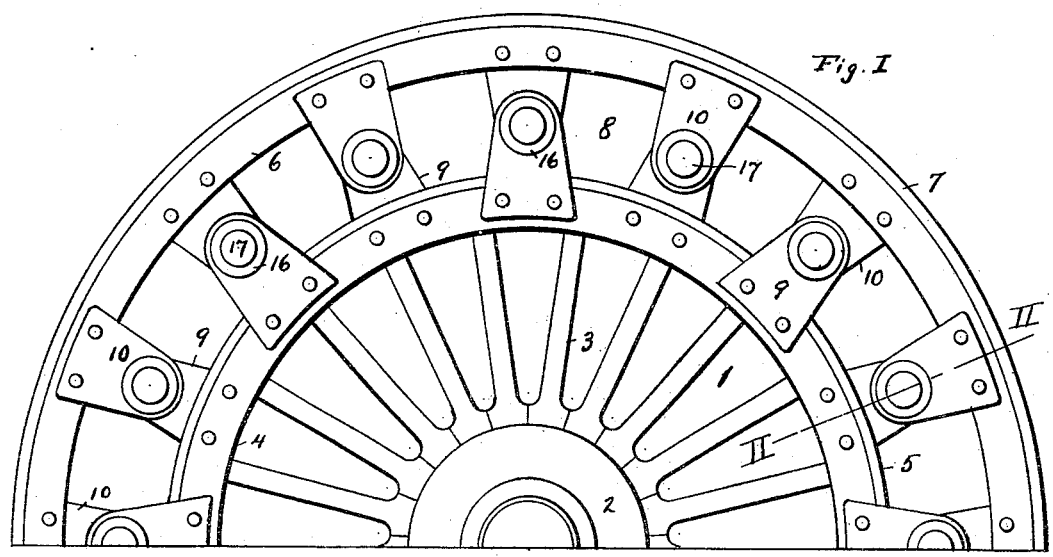
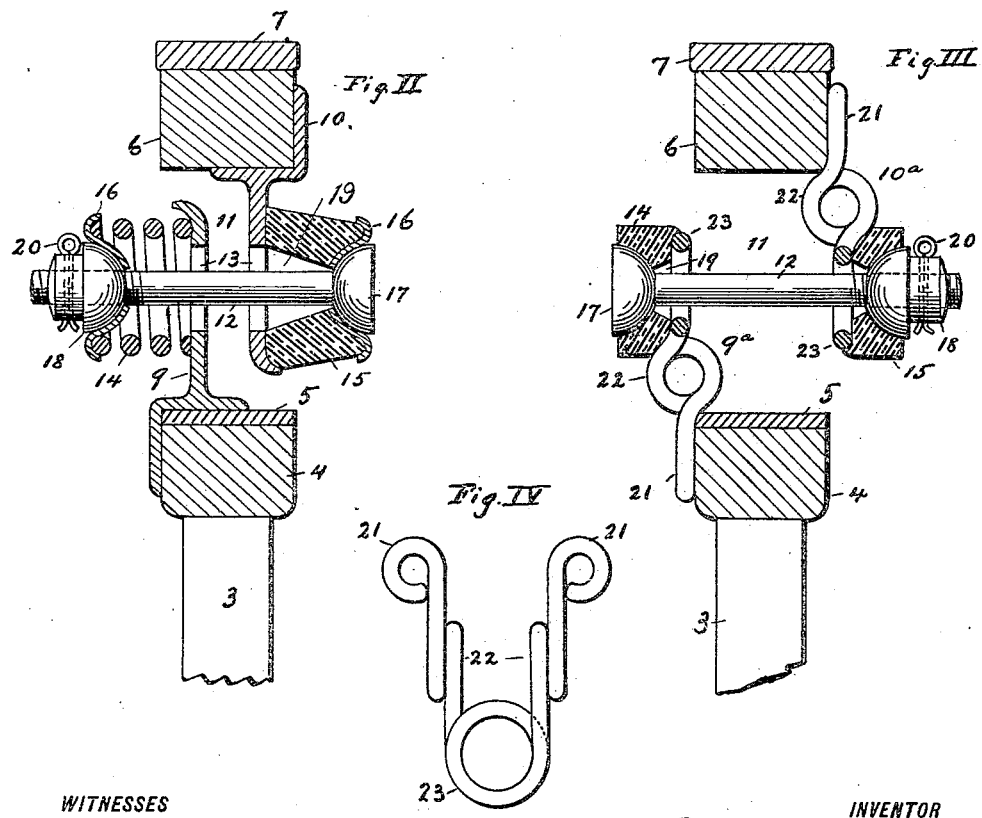
WITNESSES
INVENTOR
Peter M. Kling
BY
Knight Bros
ATTORNEYS

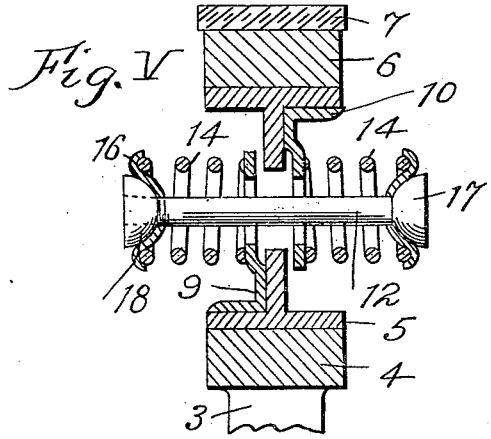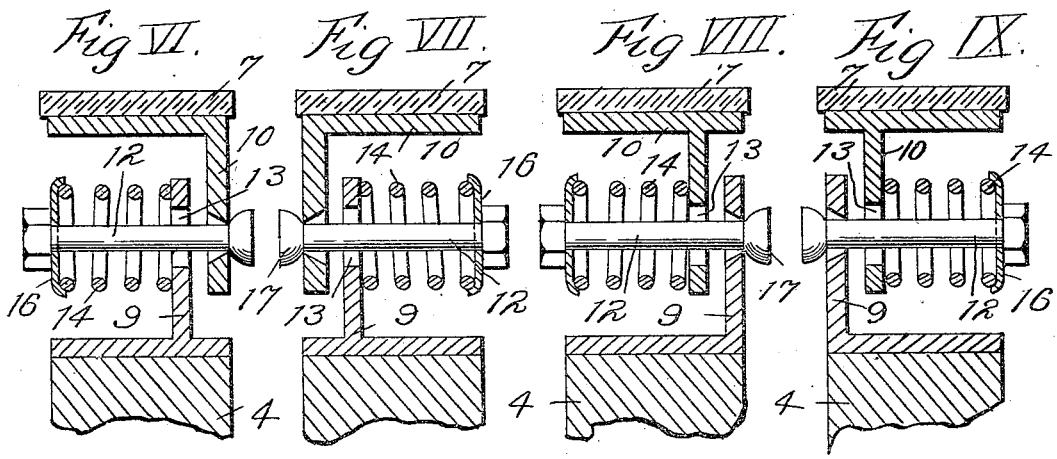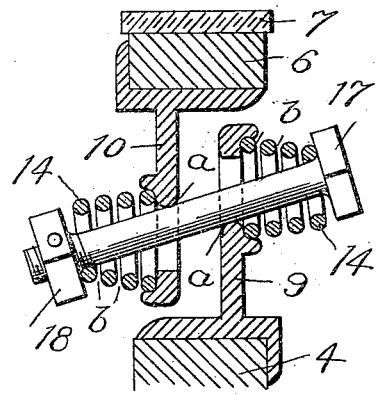

UNITED STATES PATENT OFFICE.

PETER M. KLING, OF ALLEGHENY, PENNSYLVANIA.

SPRING-WHEEL.

954,522.  Specification of Letters Patent.  Patented Apr. 12, 1910.

Application filed August 15, 1906. Serial No. 330,717.

*To all whom it may concern:*

Be it known that I, PETER M. KLING, a citizen of the United States, resident of Allegheny, county of Allegheny, State of Pennsylvania, have invented certain new and useful Improvements in Spring-Wheels, of which the following is a specification.

My invention has for its object the production of a spring wheel for vehicles, having the advantages of a cushion without the need of a pneumatic tire.

My wheel will furnish resiliency, cushioning the blows before the jolt reaches the axle. It will afford a substitute for the expensive and dangerous pneumatic tire, as my wheel cannot explode. It will also be more economical in operating and maintaining by reason of its novel construction and by reason of the materials used in the construction. With its simplicity it will furnish the same resiliency and easy riding qualities that a wheel has with the pneumatic or cushioned tire.

On my wheel a solid tire can be used, as the cushioning and soft riding is accomplished between the inner and outer wheels through the connections.

My improved structure is of the type of a wheel within a wheel, and is so constructed as to cushion itself between the inner and outer wheels and not on the tire, and comprises, (in addition to detail matters which will appear in the following specifications) as its main elements: First, transversely arranged bolts parallel with the axle, which take the main strain. Second, compression springs or cushions or spring brackets.

I have illustrated several forms of my invention in the accompanying drawings forming a part hereof, and it will be understood that modifications in detail may be made without departing from the invention.

In said drawings Figure I is a side elevation of one-half of my improved wheel, having my improved construction and design applied. Fig. II is a sectional view thereof on the radial plane indicated by the line II—II Fig. I. Fig. III is a similar view illustrating a modified form. Fig. IV is a detail elevation of the form of the spring bracket or hanger, illustrated in Fig. III. Figs. V to IX show other modified forms of the invention. Fig. X is a diagrammatic representation of the position assumed by the connected members of my improved duplex wheel under an excessive load.

The body or hub portion of the wheel is shown at 1, comprising a hub 2, spokes 3, felly 4, and the binding rim 5. These parts I will refer to as the inner wheel and its construction may be that shown, or any preferred form.

The outer wheel consists of the felly 6 and a suitable tire 7, preferably made of steel or rubber or both, fixed to the felly 6 in any preferred manner.

The resilient supporting member is arranged in the space 8 between the inner and outer wheel, and is constructed as follows:— 9—9 (Figs. I and II) are a series of brackets or spring supports, fixed as shown in Fig. I, alternately on opposite sides of the inner wheel, while 10—10 are similar brackets or spring supports, fixed alternately on opposite sides of the outer wheel. The brackets 9—10 are so disposed that the bracket 9 on the one side of the inner wheel is arranged parallel to and opposite the bracket 10, arranged on the opposite side of the outer wheel, and each pair of brackets alternates in this relation around the wheel. The space 11 is clearance between the brackets (see Fig. II), and can be made as small as practical, as these can never be brought together as long as the bolts and spring brackets or spring cushions remain intact. The opposing brackets of the inner and outer wheels are coupled together by bolts 12 which pass through openings 13 in said brackets and have resilient support on the outer sides of the brackets. The bolt is resiliently supported either by making brackets 9—10 of spring metal, or, as shown in Fig. II, by interposing cushions or springs 14, 15, between the brackets 9—10 and washers 16 seated against the head 17 and nut 18 of the bolt. As here shown the cushion 14 is a spiral wire spring and the cushion 15 a rubber block or ring, but if preferred a wire spring may be used on each side, as shown in Fig. V, or a rubber cushion on each side, as shown in Fig. III, or other forms of spring may be employed in both places. Spaces 19 within the cushions allow the bolt to be deflected from the position parallel to the axle when necessary by reason of changing weight upon the wheel, and to permit freedom of motion in a direction radial to the wheel, the washers 16 are preferably of the dished shape shown, and the inner surfaces of the head 17 and nut 18 are hemispherical to correspond. To lock nut 18 in position a cotter key 20 or other means may be employed.

In the form of the invention shown in Figs. III and IV I have illustrated the brackets 9ª—10ª as made of bent wire so that they themselves will afford resilient support to the bolts. As here shown the spring brackets 9ª—10ª are bent to have eyes 21 (whereby they may be attached to the wheels), coil spring portions 22, and the supporting eye 23 for the cushion springs 14, 15.

Fig. V is a modification of Fig. II having also a spring 14 on the right side between bracket 10 and bolt-head 17 instead of the cushion 15 of Fig. II.

In the above described forms of the invention, a single transversely arranged rod or bolt extends transversely to the cushioning space and engages two springs, one spring connected to the inner and the other to the outer wheel. In the form of my invention shown in Fig. VI, each spring 14 is a single compression spring and the bolt or rod 12 passes through it and through parallel lugs, flanges or brackets 9, 10 on the respective inner and outer wheels. Figs. VI and VII show respectively the reversed arrangement of the alternating springs and hangers around the wheel—the arrangement of the parts shown in Fig. VI alternating with that shown in Fig. VII, so that a reversed direction of strain of the spring on the respective inner and outer wheels is obtained at consecutive hangers.

Figs. VIII and IX show alternating arrangements of a form of spring and hanger similar to those of Figs. VI and VII but having the relative portions of the hangers reversed. In practice the structure shown in Fig. VI may alternate around the wheel with that shown in Fig. VIII, and that shown in Fig. VII with that shown in Fig. IX.

I consider all the forms of cushioning members above described as having compression springs, as the strain of the tension bolts or rods is in each case, to draw the outer ends of the springs toward each other.

It will be apparent that when in use the load upon the inner wheel is transmitted to the outer wheel simultaneously through the entire series of annularly disposed resilient suspension members, comprising the substantially horizontal bolts 12, placed parallel with the axle, and their resilient supports; that the bolt construction shown is strong and rigid in action, and that by the use of compression springs great strength and durability are obtained in forming a wheel within a wheel, tied together with bolts, placed horizontally in line with the axle, supported by spring brackets or solid brackets with spring cushions, spaced alternately on the outside of the inner wheel and on the inner side of the outer wheel in such manner as to oppose each other by the tension brought against them, by tensioning the bolt or by the load put on the wheel. The form of mechainsm adopted permits the ready adjustment of tension of the springs when in place, thus assuring equal distribution of tension on all.

The diagram, Fig. X, illustrates several features of practical superiority in my mode of locating and arranging the compression springs in position to press together the two brackets of each pair, in contradistinction to the use of springs located between the paired brackets, so as to be compressed in forcing them together by the action of the confining bolts.

For heavy service I find it better to use bolts with square heads bearing on the compression springs as illustrated in Fig. X instead of convex head bolts and nuts as illustrated in Fig. II. As indicated in the diagram, Fig. X, more prompt and effective compression of the springs results from the use of the square head bolts, tending to resist angular deflection under a load. With the brackets located between the spring cushions, should the wheel become overloaded the brackets on the inner and outer wheel members will be forced in opposite directions and will meet the bolts at the points marked $a$, and thus practically form a solid or rigid wheel resting on all the bolts in the wheel, and no further harm can come to the wheel during the overload, and as soon as the overload or strain is removed the wheel will go back to its original position and resiliency. Another feature of practical utility is that with the wheel in compression I can compress the springs to any degree even to the extent of completely closing the spaces ($b$) between the coils of the springs so as to eliminate the resiliency of the springs and provide in effect a rigid or solid wheel, to which no harm can come by an overload. The safeguards which I thus provide against the crushing and wrecking of the wheel by overloading constitute valuable features of superiority in my invention.

Having thus described my invention what I claim as new and desire to secure by Letters Patent is:—

1. In a structure of the character described, the combination of inner and outer wheels, brackets alternately arranged on opposite sides of such members, each of said brackets having an opening of suitable size, bolts connecting said brackets and passing through said openings and yielding means between said bolts and said brackets, adapted to hold said bolts yieldingly connected to said brackets, the bolts having freedom of radial and horizontal movement in said openings, substantially as described.

2. In a structure of the character described, the combination of inner and outer wheels, brackets alternately arranged on opposite sides of such members, each of said brackets having an opening of suitable size, bolts passing through said openings and connecting such brackets and compression springs between said bolts and said brackets, said bolts passing through said springs and having freedom of radial and horizontal movement in said openings, substantially as described.

3. In a structure of the character described, the combination of the inner and outer wheels, a series of alternately arranged brackets on opposite sides of the wheels, tension bolts connecting oppositely disposed brackets of said wheels, cushions on said tension bolts, dished washers engaging the outer faces of said cushions, the inner faces of said cushions abutting against said brackets, said tension bolts having heads with curved faces corresponding to such dished washers.

4. In a structure of the character described, the combination of the inner and outer wheels, a series of alternately arranged brackets on opposite sides of the wheels, tension bolts connecting oppositely disposed brackets of said wheels, springs on said bolts, dished washers engaging the outer faces of said springs, the inner faces of said springs abutting against said brackets, said tension bolts having heads with curved faces corresponding to such dished washers.

5. A wheel consisting of concentric inner and outer members having paired overlapping brackets projecting from the outer periphery of the inner member and the inner periphery of the outer member in combination with compression springs and confining bolts having a suitable head at either end, said springs interposed between said brackets and said bolt heads and tending to press together the two overlapping brackets of each pair, the outwardly projecting brackets of the inner wheel member and the inwardly projecting brackets of the outer wheel member being each arranged alternately in two oppositely presented series whereby the tendency of the springs to press together the members of each pair of brackets is resisted by the similar tendency exerted on the brackets of adjacent pairs.

6. A vehicle wheel having an inner rim, an outer rim, a series of bearing members secured to each rim and arranged in opposing pairs, a compression spring seated at its inner end against each of the bearing members, and bolts extending horizontally through the bearing members and springs and having seats for the outer ends of the springs.

7. A vehicle wheel having an inner rim, an outer rim, bearing plates or members secured to each of the rims and arranged in opposing pairs, a bolt extending loosely through each pair of bearing members and having spring seats thereon, compression springs on said bolts between said seats and the bearing members, and means for limiting the relative movement of the bearing members.

PETER M. KLING.

Witnesses:
OCTAVIUS KNIGHT,
ELLEN HOUGH.